No. 709,999. Patented Sept. 30, 1902.
A. C. McCORD.
SPRING CUSHION.
(Application filed Apr. 5, 1902.)
(No Model.)
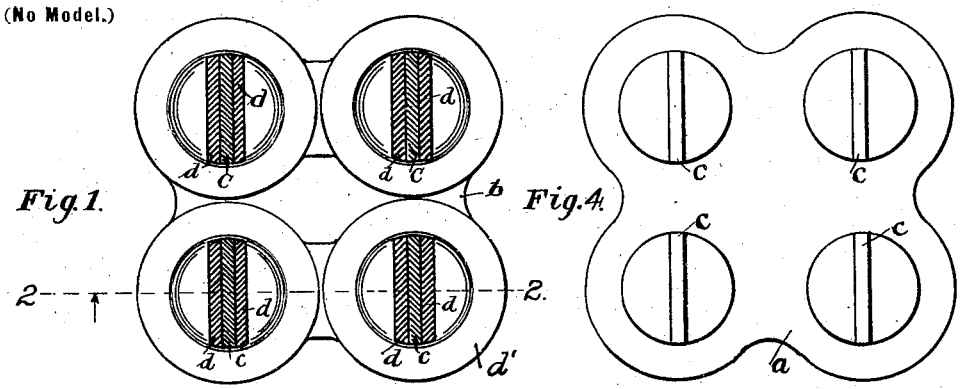
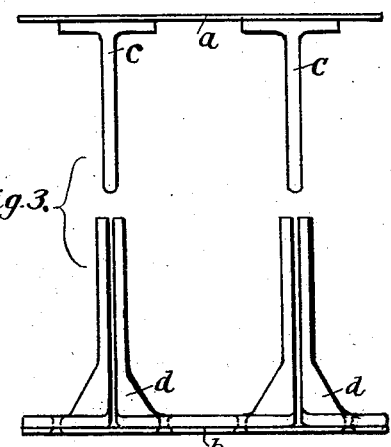
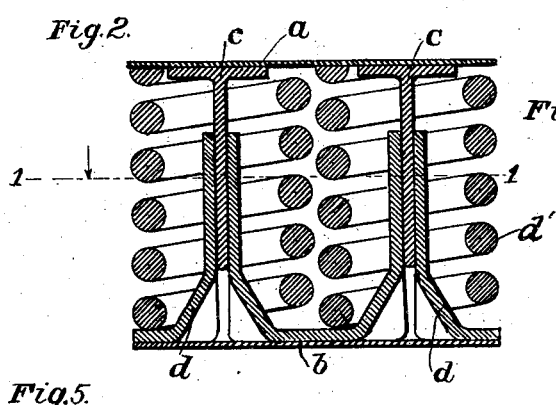
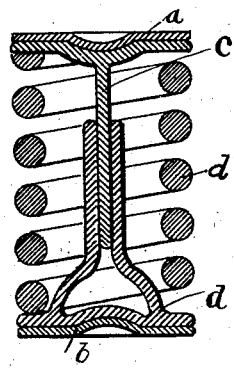
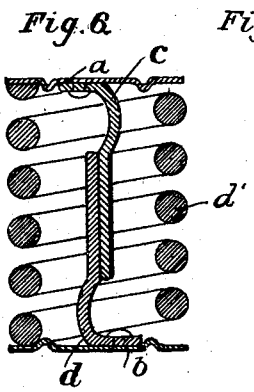
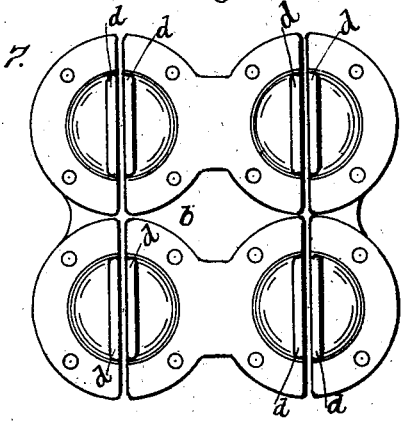
WITNESSES.
Lynn A. Williams
Harvey L. Hanson
INVENTOR
Alvin C. Mc. Cord
BY Charles A. Brown & Cragg
ATTORNEYS.

UNITED STATES PATENT OFFICE.

ALVIN C. McCORD, OF CHICAGO, ILLINOIS, ASSIGNOR TO McCORD & COMPANY, OF CHICAGO, ILLINOIS, A CORPORATION OF NEW JERSEY.

SPRING-CUSHION.

SPECIFICATION forming part of Letters Patent No. 709,999, dated September 30, 1902.

Application filed April 5, 1902. Serial No. 101,501. (No model.)

*To all whom it may concern:*

Be it known that I, ALVIN C. MCCORD, a citizen of the United States, residing at Chicago, in the county of Cook and State of Illinois, have invented a certain new and useful Improvement in Spring-Cushions, (Case No. 11,) of which the following is a full, clear, concise, and exact description, reference being had to the accompanying drawings, forming a part of this specification.

My invention relates to spring-cushions employing coiled springs in combination with retarders or dampeners made of spring metal, whereby friction may be secured to reduce the vibration of the coiled springs. A device of this class heretofore constructed comprises two cap-plates—an upper and a lower—having side flanges, one cap-plate inclosing another, whereby the flanges of the cap-plates are brought into frictional engagement with each other owing to the resiliency of these plates, which are made of spring metal. These flanges have usually been longitudinally extended, so as to embrace a plurality of springs placed abreast; but such devices have not met with the satisfaction desired, owing to the fact that they have not given the desired degree of flexibility in operation where a group of four springs, for example, has been employed, arranged at the corners of a quadrilateral.

I have devised a structure wherein effective operation may be secured not only where springs are placed abreast, but also where they are gathered in groups and disposed at the corners of quadrilaterals. To this end each spring is provided with a complete friction-producing element in addition thereto, and in order that the desired results may be secured the friction devices are surrounded by coiled springs, which arrangement permits the coiled springs to be placed as close together as is desirable. To complete the structure of the preferred embodiment of the invention, a group of springs is provided with common cap-plates, upper and lower, there being as many friction elements mounted upon each cap-plate as there are springs, the friction elements upon one cap-plate engaging the friction elements upon the companion cap-plate, the elements upon one plate engaging the elements upon the other plate within the coiled springs.

In the preferred embodiment of the invention the cap-plates are preferably without side flanges, the friction elements within the springs preferably serving to maintain the same in position. By this arrangement, therefore, it will be apparent that the spring-cushion as an entirety may be greatly simplified.

The device of my invention is preferably adapted for use in supporting railway-cars, as passenger and freight cars, upon trucks, though it is not to be restricted to this adaptation.

I will explain my invention more fully by reference to the accompanying drawings, in which—

Figure 1 is a sectional plan on line 1 1 of Fig. 2. Fig. 2 is a sectional elevation on line 2 2 of Fig. 1. Fig. 3 is an elevation of the cap-plates entering into the structure illustrated in Figs. 1 and 2. Fig. 4 is a view from beneath of the upper cap-plate. Fig. 5 is a view of a modification of the structure of my invention. Fig. 6 is a view of still another modification. Fig. 7 is a plan view of the lower cap-plate.

Like parts are indicated by similar characters of reference throughout the different figures.

In accordance with the invention the cap-plates $a$ and $b$ are provided with friction elements $c$ and $d$, which are thrown into frictional engagement by the resiliency of one of these elements, as the element $d$, which is made of spring metal, as indicated in Figs. 1 to 5, inclusive, and Fig. 7, or both of the elements carried by the cap-plates may be made of spring metal, as indicated in Fig. 6.

In the form illustrated in Figs. 1 to 5, inclusive, and Fig. 7 one of the cap-plates, as the lower cap-plate, is provided with a pair of pincer-jaws constituting the friction element $d$ for each coiled spring, these pincer-jaws being made of spring metal. The upper cap-plate is provided with a tongue constituting the friction element $c$ for each coiled spring $d'$, this tongue being engaged between the jaws of the corresponding pincer and which tongue may or may not be made of spring metal, as is desired. The resiliency of the pincer-jaws is such that when the tongues are removed from engagement therewith the jaws approach each other, as indicated in Fig. 3. When the tongues are forced between the jaws, these jaws are separated against the resiliency thereof, so that a positive spring-pressure is brought to bear between the jaws and the intervening tongue. As the springs vibrate, due to the load, there is friction between the friction elements which suffices to reduce the vibrations of the coiled springs. In the form shown in Fig. 6 both elements are made of spring metal, and they are flexed in such a manner that they exert spring-pressure in opposite directions, whereby they are available where they overlap to retard the vibration of the spring. The friction elements are preferably formed as indicated most clearly in Fig. 5, where they are provided with enlargements at their bases substantially filling the ends of the bore of the spring, so that side flanges upon the cap-plates may be dispensed with.

In Figs. 2 and 3 the lower friction elements are illustrated with conical bases, whereas in Fig. 5 the bases have a more curved form.

It will be apparent that when a group of springs, as four, are assembled, as indicated in Figs. 1 and 2, there is a certain independence in the operation of the springs and the friction elements associated therewith which cannot be secured if there is a single friction device common to such a group of springs.

I have only shown at each spring-cushion a single coiled spring. I use the term "spring," however, in the sense of a single coil or more than a single coil nested together.

Having thus described my invention, I claim as new and desire to secure by Letters Patent—

1. In a spring-cushion, the combination with a plurality of coiled springs placed side by side, of upper and lower cap-plates, friction elements carried by the upper cap-plate corresponding in number with the number of coiled springs and extending to the interior thereof, and friction elements carried by the lower cap-plates corresponding in number with the number of coiled springs and also extending into the interior of the coiled springs, a friction element within each coiled spring being formed of spring metal, whereby it is brought into frictional engagement with a companion friction element by reason of its resiliency, substantially as described.

2. In a spring-cushion, the combination with four coiled springs arranged at the corners of a quadrilateral, of upper and lower cap-plates, friction elements carried by the upper cap-plate corresponding in number with the number of coiled springs and extending to the interior thereof, and friction elements carried by the lower cap-plates corresponding in number with the number of coiled springs and also extending into the interior of the coiled springs, a friction element within each coiled spring being formed of spring metal, whereby it is brought into frictional engagement with a companion friction element by reason of its resiliency, substantially as described.

3. In a spring-cushion, the combination with a coiled spring, of a friction element composed of spring metal extending into the interior thereof, and a second friction element adapted for frictional and sliding connection with the aforesaid friction element by reason of the resiliency of the first aforesaid friction element, substantially as described.

4. In a spring-cushion, the combination with a coiled spring, of a friction element composed of spring metal extending into the interior thereof, and a second friction element adapted for frictional and sliding connection with the aforesaid friction element by reason of the resiliency of the first aforesaid friction element, one of said friction elements being formed at its base to fit the interior of the coiled spring, substantially as described.

5. In a spring-cushion, the combination with a coiled spring, of a friction element composed of spring metal extending into the interior thereof, and a second friction element adapted for frictional and sliding connection with the aforesaid friction element by reason of the resiliency of the first aforesaid friction element, both of said friction elements being formed at their bases to fit the interior of the coiled spring, substantially as described.

6. In a spring-cushion, the combination with a coiled spring, of a pair of spring-jaws within the same, mounted at one end of the coiled spring, a tongue also within the coiled spring and mounted at the other end thereof, the tongue being engaged between the jaws and being adapted for sliding and frictional engagement therewith, the jaws engaging the tongue by reason of the resiliency of the jaws, substantially as described.

7. In a spring-cushion, the combination with a coiled spring, of an element for frictional contact formed of resilient material and projecting within the coiled spring, substantially as described.

In witness whereof I hereunto subscribe my name this 3d day of April, A. D. 1902.

ALVIN C. McCORD.

Witnesses:
GEORGE L. CRAGG,
HARVEY L. HANSON.